US008204772B2

(12) United States Patent
Babazadeh et al.

(10) Patent No.: US 8,204,772 B2
(45) Date of Patent: Jun. 19, 2012

(54) CUSTOMER SERVICE EXPERIENCE COMPARATIVE LANDSCAPE TOOL

(75) Inventors: Farhad Babazadeh, Ormond Beach, FL (US); Corey B. Grivna, Tampa, FL (US); Gene Soo, Oakland Gardens, NY (US)

(73) Assignee: Accenture Global Services Limited, Dublin (IE)

( * ) Notice: Subject to any disclaimer, the term of this patent is extended or adjusted under 35 U.S.C. 154(b) by 1019 days.

(21) Appl. No.: 12/133,179

(22) Filed: Jun. 4, 2008

(65) Prior Publication Data
US 2009/0307022 A1    Dec. 10, 2009

(51) Int. Cl.
*G06F 17/30* (2006.01)
(52) U.S. Cl. ....................................... 705/7.11
(58) Field of Classification Search .................. 705/7.11
See application file for complete search history.

(56) References Cited

U.S. PATENT DOCUMENTS

| 2002/0013720 A1* | 1/2002 | Ozono et al. ............... 705/7 |
| 2007/0156274 A1* | 7/2007 | Dierks et al. ............. 700/108 |
| 2008/0140549 A1* | 6/2008 | Eder ......................... 705/35 |

* cited by examiner

*Primary Examiner* — Romain Jeanty
*Assistant Examiner* — Luis Santiago
(74) *Attorney, Agent, or Firm* — Brinks Hofer Gilson & Lione

(57) ABSTRACT

A capability assessment system provides a tailored evaluation with clear distinction between progressive companies and companies that offer more basic services. The system scores and rates the company across multiple categories according to a which capabilities are applicable to the company, and which of the applicable capabilities the company actually utilized. The system applies a unique rating and point mapping approach to the capabilities utilized by the company. The point mapping approach is configured to facilitate clear delineation between average and above average companies, as well as an identification of which capabilities, if utilized, can put a company ahead of its competition. This information assists a company in efficiently prioritizing and identifying which improvements to its rendered services will have the greater overall impact, benefiting both the customer and the company itself, and allowing the company to effectively recognize, meet, and exceeding customer expectations.

27 Claims, 10 Drawing Sheets

| Touchpoint | Rating | Channel | Capability |
|---|---|---|---|
| 1. Discover Service | Basic | Assisted | integration: does NOT exist between phone & online customer service |
| 1. Discover Service | Basic | Assisted | agents: different agents handle different products (e.g.,: cable, home phone, wireless) 110 |
| 1. Discover Service | Basic | Assisted | agents: able to walk customer through available services 112 |
| 2. Sign-Up for Service | Basic | Assisted | phone numbers: different for different products 114 |

| Touchpoint | Rating | Channel | Capability | |
|---|---|---|---|---|
| 1. Discover Service | Basic | Assisted | integration: does NOT exist between phone & online customer service | |
| 1. Discover Service | Basic | Assisted | agents: different agents handle different products (e.g.,: cable, home phone, wireless) | 110 |
| 1. Discover Service | Basic | Assisted | agents: able to walk customer through available services | 112 |
| 2. Sign-Up for Service | Basic | Assisted | phone numbers: different for different products | 114 |

FIG. 1

| Final Rating | Range |
|---|---|
| Basic | 0 – 1.8 |
| Parity | 1.81 – 2.49 |
| Competitive | 2.50 – 3.19 |
| Differentiated | 3.20 – 6.00 |

…

CUSTOMER SERVICE EXPERIENCE COMPARATIVE LANDSCAPE TOOL

BACKGROUND OF THE INVENTION

1. Technical Field

This application relates to comparative analysis. In particular, this application relates to rating services and capabilities delivered by a company to its customers.

2. Related Art

The growing global economy has contributed to increased competition in almost every aspect of the marketplace. With the rise in competition, companies seek increasingly reliable and informative comparisons with its competitors in order to differentiate themselves from the competition and attract business. However, providing such comparisons is a difficult endeavor.

Within and across industries, companies offer a multitude of services and capabilities to their customers. Simple consideration of which company offers more or less services and capabilities may not provide a company with enough useful information to determine where it can improve, or where it stands out above the competition. Furthermore, some services may be of greater value to the customer than others, and many other intricate evaluation details, such as how to score capabilities, influence how to provide a meaningful comparison.

Therefore, a need exists to address the problems noted above and others previously experienced.

SUMMARY

A capability assessment system provides a company-tailored evaluation with clear distinction between progressive companies and companies that offer only basic services. The system applies a flexible and effective rating and point mapping approach to a list of capabilities that may or may not be utilized by the company. The point mapping approach may include a non-linear scoring sequence and an adaptable score tuning gap within the scoring sequence. The adaptable score tuning gap may facilitate clear delineation between the average and above average companies, as well as which capabilities, if utilized, can put a company ahead of the competition.

Based on the rating and point mapping approach, a company is scored according to which capabilities are applicable to the company, and which of the applicable capabilities it actually utilized. With the final score(s), a company can efficiently prioritize and identify which improvements to its rendered services will have the greater overall impact, benefiting both customer and the company itself.

The system effectively provides objective, consistent, and detailed scoring and information about a company's practices. In addition, the system provides a clear distinction between progressive companies and companies that offer only basic services, and identifies which services set the progressive companies above the competition and/or which services a company may utilize to catch up to or surpass its competition. Accordingly, the system allows the company to effectively recognize, meet, and exceeding customer expectations.

Other systems, methods, features and advantages will be, or will become, apparent to one with skill in the art upon examination of the following figures and detailed description. All such additional systems, methods, features and advantages are included within this description, are within the scope of the invention, and are protected by the following claims.

BRIEF DESCRIPTION OF THE DRAWINGS

The system may be better understood with reference to the following drawings and description. The elements in the figures are not necessarily to scale, emphasis instead being placed upon illustrating the principles of the type model. In the figures, like-referenced numerals designate corresponding features throughout the different views.

FIG. 1 shows a portion of a master capability table.

DETAILED DESCRIPTION OF THE PREFERRED EMBODIMENTS

Figure 2:
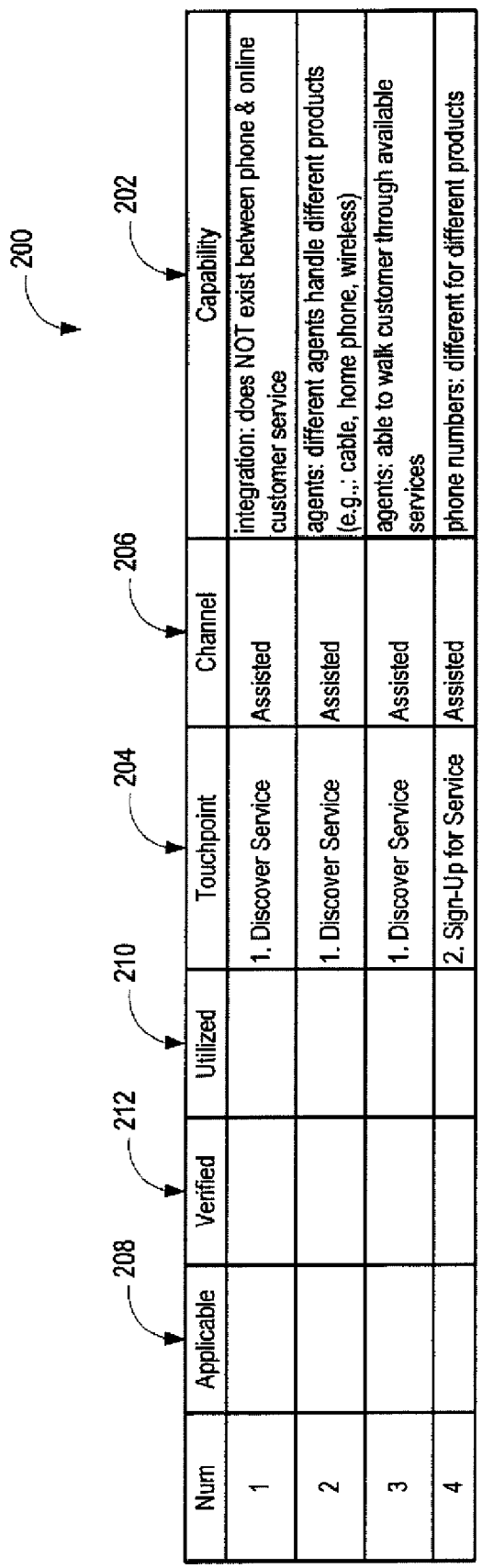
FIG. 2 shows a portion of an assessment template.

FIG. 1 shows a portion of a master capability table 100 ("table 100"). The master capability table 100 includes touchpoints 102, channels 104, and capabilities 106. The master capability table 100 may also include a rating 108 associated with each capability 106.

A touchpoint refers to a category of service that may be rendered by a client. For example, the table 100 identifies seven touchpoints (services), including 1) Discover Service, 2) Sign-Up for Service, 3) Activate Service, 4) Use Service, 5) Pay for Service, 6) Resolve Issue, and 7) Terminate Service.

The "Discover Service" touchpoint relates to services that aid customers in learning about services and products offered by the client. The "Sign-Up for Service" touchpoint relates to ordering desired products and services by the customer. The "Activate Service" touchpoint relates to the installation and/or activation of products and services for the customer. The "Use Service" touchpoint relates to the customer's interaction with the purchased products and services. The "Pay for Service" touchpoint relates to billing and receipt of payment for services rendered. The "Resolve Issue" touchpoint relates to addressing and resolving product and service issues that may arise. The "Terminate Service" touchpoint relates to the deactivation of services and/or termination of a client/customer relationship.

A channel 104 may refer to the interaction between the client and its customers. The table 100 includes the channels of Assisted, Self-Service, or Face to Face. An Assisted channel may include remote modes of communication that involve more direct client/customer interaction, such as calls center or other. The Self-Service channel may relate to, for example, online, IVR, mobile, or other remote modes of communication that may or may not involve direct or real-time client/customer interaction. The "Face to Face" channel may involve face to face client/customer interaction, such as due to a customer visit to a store/branch or a field service visit.

A capability 106 refers to a service that may be provided by the client to the customer. For example, the capabilities may refer to the client's agents and whether different agents handle different products 110 or whether the agents are able to walk the customer through the available products 112.

Each capability may be assigned to or otherwise correspond to an appropriate touchpoint and channel. The capability may correspond to a touchpoint according to the characteristics of the capability in relation to the characteristics of the touchpoints and channels. For example, the capability 114, which refers to whether the client provides different phone numbers for different products, relates to customer call-in events. Accordingly, the capability may correspond to the "Assisted" channel and "Sign-up for Service" touchpoint.

Additional, fewer, or different touchpoints, channels, and capabilities may be defined. For example, Tables 1 and 2 below each show portions of exemplary master capability lists that include different sets of capabilities, channels, and touchpoints. The types and/or descriptions of the capabilities, channels, and touchpoints may be tailored to the application in which the comparative landscape tool is used. Table 1 is a portion of a master capability list that may be used in a comparative landscape tool that assesses the overall customer experience provided by the client. Table 2 is a portion of a master capability list that may be used in a comparative landscape tool that assesses the customer service and support provided by the client.

The table 100 also associates a rating 108 with each capability 106. The table 100 uses a four-leveled rating system including, in order from lowest rating to highest rating, Basic, Parity, Competitive, and Differentiated. The ratings 108 may refer to the importance or value of a capability. A Basic rating may correspond to, for example, a rudimentary level of service rendered by a company. A Parity rating may correspond to an average service rendered by a company. A Competitive rating may correspond to an above average service rendered by a company. A Differentiated rating may correspond to a service that stands out within, or sets apart the company from, the industry. Accordingly, a differentiated capability may be scored higher than a basic capability. The capability assessment system described below may determine which capabilities apply to an industry, determine which of those applicable capabilities are utilized by a particular company within that industry, and then score the company based on the rating 108 associated with each applicable capability.

FIG. 2 shows a portion of an assessment table 200. The assessment table includes a list of capabilities 202, along with the touchpoints 204 and channels 206 associated with each capability 202. The "Applicable" column 208 identifies which capabilities 202 are applicable to the client or the client's industry. An identifier, such as a 'Y' for 'Yes' or 'N' for 'No', may be applied to each row in the "Applicable" column 208 to identify whether the corresponding capability 202 is applicable.

The configuration of the "Applicable" column 208 to a client may be industry or client specific. An assessor may configure the "Applicable" column on a client-by-client basis. As an alternative, an assessor may determine default sets of capabilities that are applicable to different specific industries, where the "Applicable" column 208 may be substantially similar for each client within a specific industry. In this example, an assessor may, as part of a preprocessing step, identify which capabilities apply to each industry. When a specific client is identified with an industry, the set of default capabilities for that industry may be applied to the "Applicable" column 208 for that client.

The "Utilized" column 210 identifies which capabilities are actually performed by the specific client with capability implementation specifiers. An assessor determines which capabilities are utilized and applies the appropriate identifiers in the "Utilized" column 210. A capability identified by, for example, a 'No' in the "Applicable" column 208 is a capability that is not applicable to that client. In some applications, whether an inapplicable capability is utilized by the client may not be relevant. Accordingly, for each capability identified as not being applicable to the client, the assessment table 200 may be configured to grey out, lock, hide, or otherwise prevent alteration to a row corresponding to an inapplicable capability. The assessment table 200 may be implemented in a spreadsheet, such as Excel®, in a programmable database, or other programmable system.

The "Verified" column 212 may identify which capabilities should be subject to further verification. For example, if it is not clear whether a capability is utilized by the client, the assessor may "check" or otherwise mark the "Verified" column's row that corresponds to that capability. The mark may indicate that further verification or investigation of the client and/or that capability should be conducted.

Figure 3:
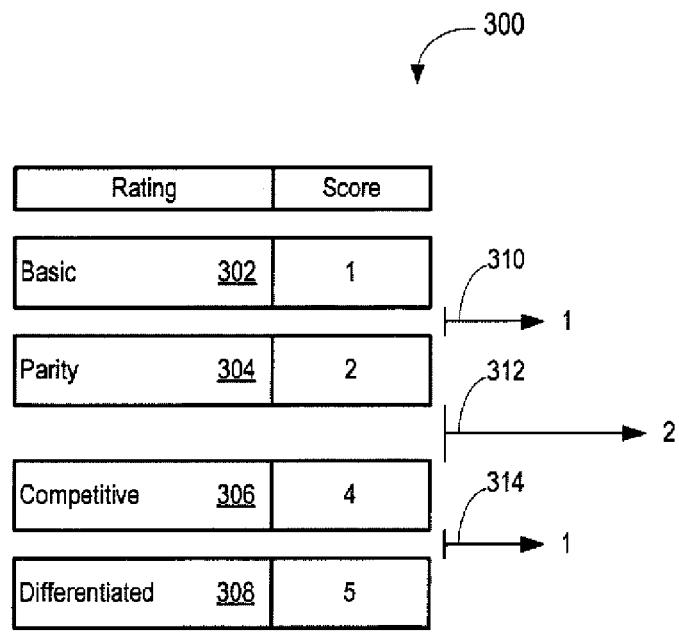
FIG. 3 shows a non-linear point mapping.

FIG. 3 shows a point mapping 300. The point mapping 300 includes four capability rating levels: Basic 302, Parity 304, Competitive 306, and Differentiated 308. The point mapping associates a capability level score with each capability rating level. The point mapping 300 in FIG. 3 is a non-linear point mapping characterized with a non-linear progression of scores between capability rating levels. The scores shown in FIG. 3 progress between ratings as follows: 1, 2, 4, 5. Rather than increasing linearly from every rating to the next, the point mapping 300 includes the non-linear jump from 2 to 4 between adjacent ratings Parity and Competitive. A tuning gap 310 of one point is present between Basic and Parity level, a tuning gap 312 of two points is present between Parity and Competitive level, and a tuning gap 314 of one point is present between Competitive and Differentiated level. Each tuning gap 310-314 may be independently adjusted to tailor the point mapping 300 for application to any particular industry or application. The tuning gaps are not limited to integers.

Other point mapping approaches may be used and adapted to specific applications. The non-linear progression of scores from Basic to Differentiated may be configured or customized to any application to give helpful and meaningful results. For example, a non-linear progression of capability scores may weight or further set apart certain capability rating levels. As noted above, the non-linear progression of scores may be adapted by modifying the tuning gaps 310-314. The adaptable score tuning gaps facilitate differentiation of companies that utilize Competitive or Differentiated capabilities to set themselves apart from those that utilize Basic or Parity capabilities. The capability level score may be configured for different applications, different industries, or according to other factors.

Figure 4:
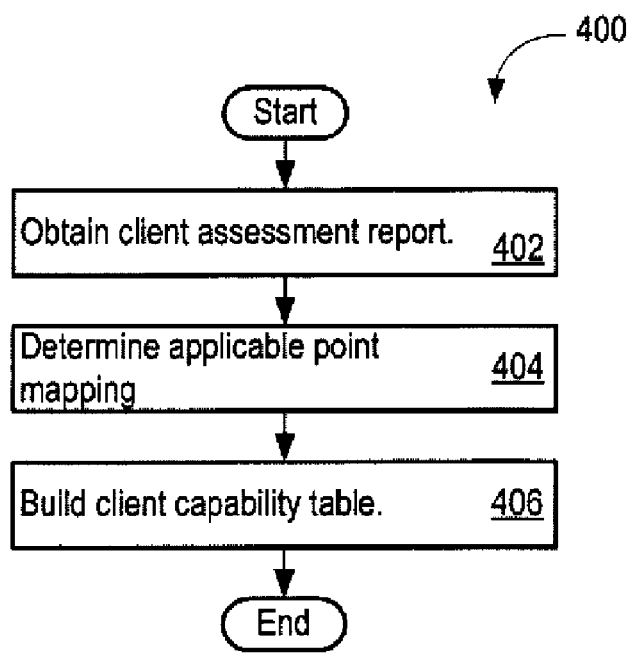
FIG. 4 shows a flow diagram for client capability table generating logic.

FIG. 4 shows a flow diagram 400 for client capability table generating logic. The client capability table generating logic obtains a client assessment report (402). The client assessment report may be generated by an assessor that determines whether capabilities that are applicable to the client, or to the client's industry, are implemented by that client. Alternatively, the client may submit answers to queries manually or automatically, such as through a web portal into the system, that define the client assessment report. The client assessment report may include capability implementation identifiers, such as a "Yes" or "No", that identifies whether an applicable capability is implemented or utilized by the client. The capability assessment report may be input in a spreadsheet, such as an Excel® spreadsheet or Lotus® spreadsheet. The client capability table generating logic described below may store the client assessment report in a memory.

The client capability table generating logic may determine an applicable to point mapping for the client assessment report (404). The applicable point mapping, such as the point mapping 300 shown in FIG. 3, may include a capability rating level and capability level scores associated with each capability rating level. The applicable point mapping may be determined on a client by client, or industry by industry basis, and/or based on other factors. For example, the same, or a substantially similar, point mapping may apply to clients within a certain industry. The client capability table generating logic may identify the relevant industry associated with a particular client. The assessor that generates the client assessment report may alternatively identify the relevant industry.

The client capability table generating logic may build a client capability table (406). The client capability table may include capability implementation specifiers, capability IDs for the capability implementation specifiers, and point assignments retrieved from the applicable point mapping for the capability IDs. The capability implementation specifiers may be numerical or other values that specifiers whether a capability is utilized by the client. The capability IDs may be unique IDs associated with each of the capabilities. The unique IDs may include a numerical, alphanumeric, or other format. The point assignments may include the capability level scores identified in the applicable point mapping.

Figure 5:
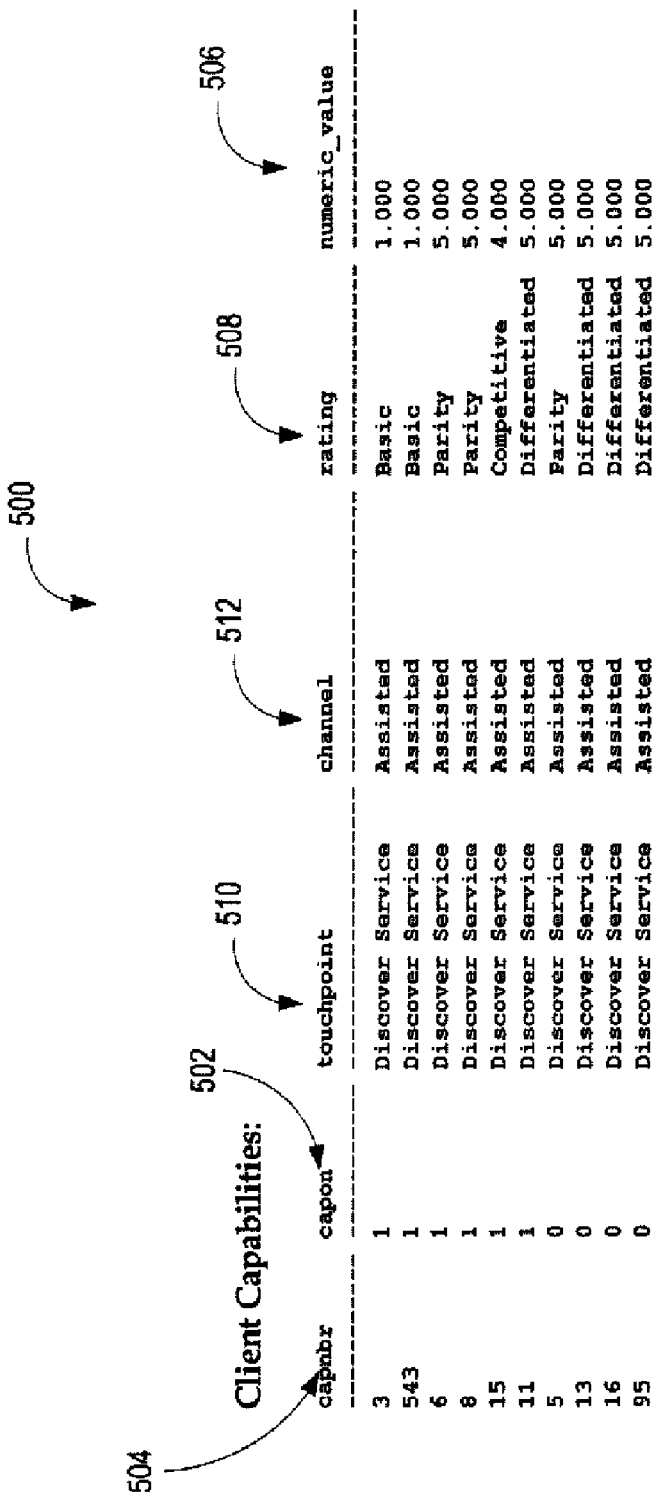
FIG. 5 shows a client capability table.

FIG. 5 shows a client capability table 500. The client capability table 500 includes capability implementation specifiers 502, capability IDs 504 for the capability implementation specifiers 502, and point assignments 506 retrieved from the applicable point mapping for the capability IDs. In FIG. 5, the capability implementation specifiers 502 associate a '1' for capabilities that are utilized by the client and a '0' for capabilities that are not utilized by the client. The point assignments 506 shown in FIG. 5 correspond to the point mapping shown in FIG. 3 in which a capability level score of 1, 2, 4, and 5 correspond to the capability rating levels 508 of Basic, Parity, Competitive, and Differentiated, respectively.

The client capability table 500 may also include the capability rating levels 508 associated with each capability, as well as a touchpoint identifier 510 and a channel identifier 512 associated with each capability. The touchpoint identifiers 510 and channel identifiers 512 may include an identification of the touchpoint and channel, respectively, associated with each capability. The touchpoint identifiers 510 and channel identifiers 512 are identified with text in the client capability table 500. The client capability table 500 may alternatively include other identifiers, such as unique numerical IDs associated with each touchpoint and channel.

Figure 6:
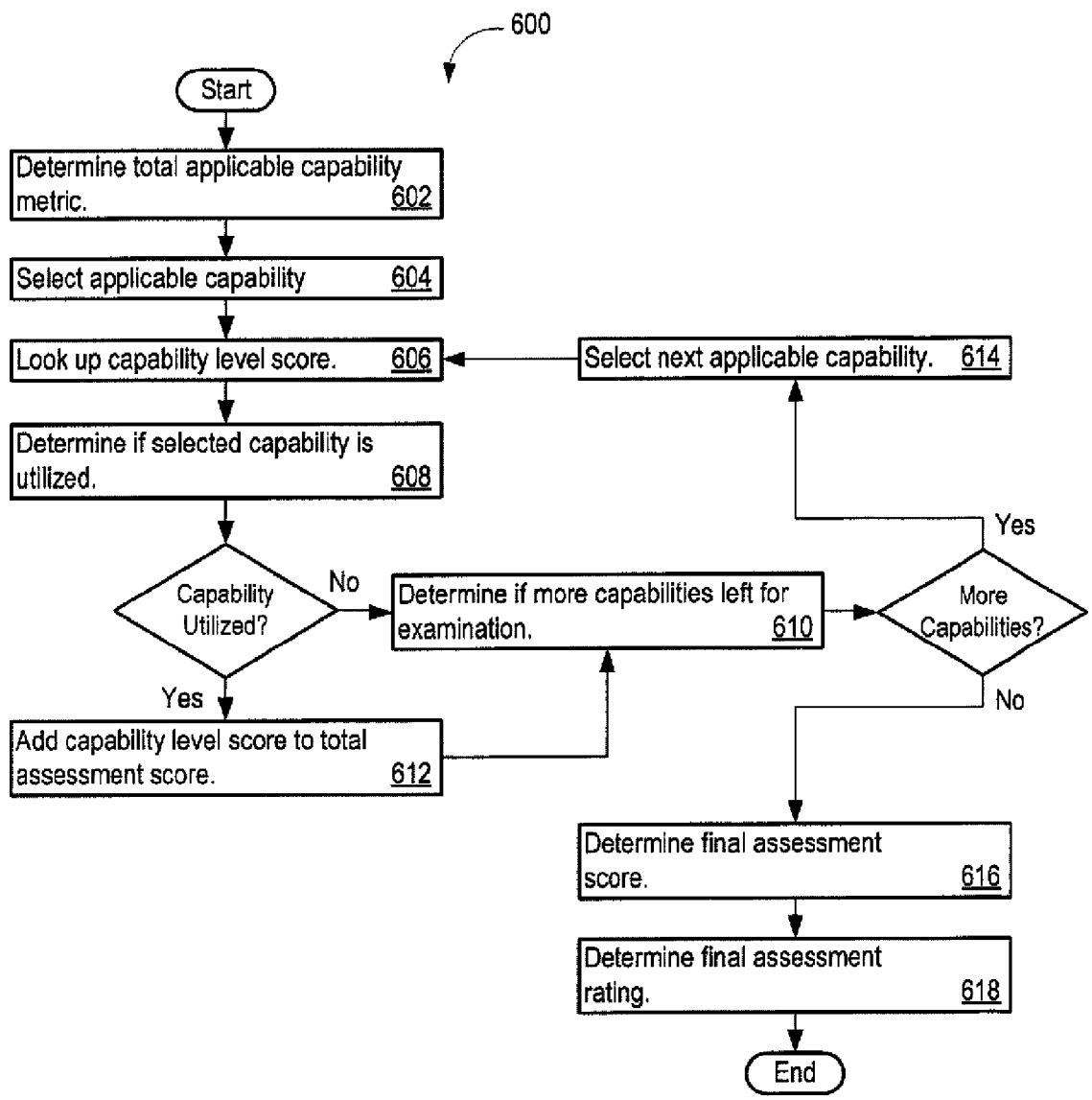
FIG. 6 shows a flow diagram for score determining logic.

FIG. 6 shows a flow diagram 600 for score determining logic. The score determining logic may determine a total applicable capability metric (602). The total applicable capability metric may include the total number of applicable capabilities across an identified capability group. The identified capability group may include all touchpoints, a single touchpoint, a single channel, a combination of touchpoints or channels, a specific channel within a touchpoint, and/or other groupings of applicable capabilities. For example, the client capability table 500 may correspond to an identified capability group including capabilities within the "Discover Service" touchpoint and "Assisted" channel. Accordingly, the score determining logic may determine that the total applicable capability metric corresponding the client capability table 500 is ten (10), which equals the total number of applicable capabilities with the identified capability group (i.e., with the "Discover Service" touchpoint and "Assisted" channel). FIG. 6 is further discussed with reference to the client capability table 500. However, the client capability table 500 is an example only and may vary according to the client, industry, application, identified capability group, and/or other factors.

The score determining logic selects an applicable capability from the identified capability group (604). The applicable capability may be selected from a client capability table 500 generated by client capability table generating logic. The selected applicable capability may be identified according to the capability identifier 504.

The score determining logic looks up a capability level score associated with the selected applicable capability (606). The score determining logic may look up the capability level score from the client capability table. For example, if the selected applicable capability corresponds to the capability identifier 243 in FIG. 5, the scored determining logic may look up or otherwise retrieve the corresponding capability level score of 1.000. The score determining logic determines whether the selected applicable capability is utilized by the client (608). The score determining logic may look up the capability implementation specifier 502 from the client capability table 500 that corresponds to the selected applicable capability. The looked up capability implementation specifier 502 indicates whether the corresponding applicable capability is utilized by the client. For example, if the selected applicable capability corresponds to the capability identifier 243, the score determining logic may retrieve the corresponding capability implementation specifier as a '1', indicating that the selected applicable capability is utilized by the client.

If the selected applicable capability is not utilized by the client, the score determining logic determines whether there are more applicable capabilities from the identified capability group to be examined (610). If the selected applicable capability is utilized by the client, the score determining logic adds the capability level score (obtained at block 606) to a running total of a total assessment score (612). The total assessment score may represent a running total of the summed capability level scores associated with each applicable capability that is utilized by the client. According to block 608, a capability level score associated with a non-utilized capability may not be added to the total assessment score.

The score determining logic determines whether there are more applicable capabilities from the identified capability group to be examined (610). If there are more applicable capabilities to be examined, the score determining logic selects a next applicable capability (614) and repeats the instructions of blocks 606-612. According to blocks 606-612, the score determining logic adds the capability level score associated with each utilized capability to the running total of the total assessment score (612). The client capability table 500 indicates that six (6) out of the ten (10) applicable capabilities are utilized. The score determining logic adds the capability level scores 506 associated with the utilized capabilities to the total assessment score.

With respect to the client capability table 500, the score determining logic will generate a total assessment score of fifteen (15). The capabilities 512-522 correspond to utilized capabilities. In particular, two capabilities 512 and 514 have a capability level score of '1'; two capabilities 516 and 518 have a capability level score of '2'; on capability 520 has a capability level score of '4'; and one capability 522 has a capability level score of '5'. Accordingly, the total assessment score may be determined as $2 \times 1 + 2 \times 2 + 1 \times 4 + 1 \times 5 = 15$.

If there are no remaining applicable capabilities to be examined, the score determining logic generates a final assessment score (616). The final assessment score may be a numerical score that provides a useful client rating across the identified capability group. The final assessment score may be obtained based on the total assessment score by the total applicable capability metric. For example, the score determining logic may generate the final assessment score by dividing the total assessment score by the total applicable capability metric. With respect to the client capability table 500, the final assessment score may be 1.5, which equals the total assessment score (15) divided by the total applicable capability metric (10).

The score determining logic may determine a final assessment rating (618). Based on the final assessment score, the score determining logic may assign the final assessment rating to the client. The score determining logic may compare the final assessment score with a client rating scale to determine the final assessment rating. The client rating scale may include a numerical range associated with each possible rating (e.g., Basic, Parity, Competitive, and Differentiated). The score determining logic may assign the final assessment rating according which numerical range the final assessment score falls within. For example, client rating scale may associate a final assessment score of between 0-1.8 to a Basic rating. In this example, the score determining logic would determine a final assessment rating of "Basic" based on the final assessment score of 1.5.

The final assessment rating may correspond to the identified capability group. If the identified capability group includes capabilities across all touchpoints, the final assessment rating will apply to the client's rating across all touchpoints. Similarly, if the identified capability group includes capabilities across a specific channel, the final assessment rating will apply to the client's rating across that channel. The identified capability group corresponding to the client capability table 500 shown in FIG. 5 included capabilities within the "Discover Service" touchpoint and "Assisted" channel. Accordingly, the final assessment score of 1.5 and final assessment rating of "Basic" correspond to the client's capabilities within the "Discover Service" touchpoint and "Assisted" channel. A client may be interested in ratings across multiple capability groups. The score determining logic may determine, according to the flow diagram 600, final assessment scores and ratings for multiple client capability groups.

Figure 7:
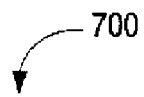
FIG. 7 shows a client rating scale.

FIG. 7 shows a client rating scale 700. The client rating scale 700 includes numerical ranges associated with a final assessment rating. Score to determining logic may compare a final assessment score to the numerical ranges to obtain a final assessment rating for the client. For example, the numerical ranges may be different for different industries, or based on other relevant factors. In addition, the value of certain capabilities may evolve over time. For example, a capability that was once valued highly with a "Differentiated" rating, may have decreased in importance some number of years later. As capabilities evolve, the corresponding capability level score, as well as the numerical ranges of the client rating scale may change accordingly.

Figure 8:
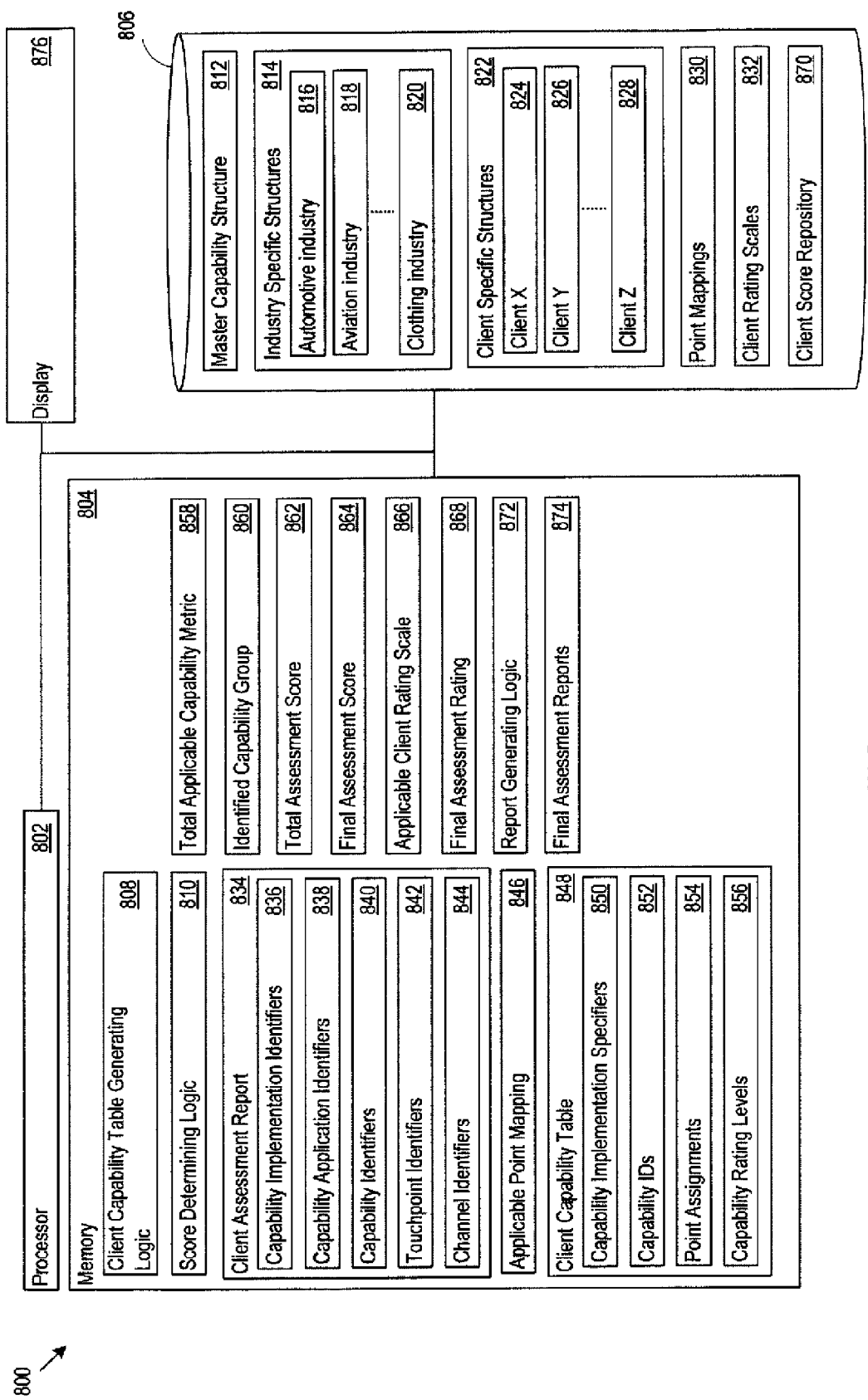
FIG. 8 shows a capability assessment system.

FIG. 8 shows a capability assessment system ("system") 800. The system 800 includes a processor 802, a memory 804, and assessment database 806. The memory 804 holds client capability table generating logic 808 and score determining logic 810 that assist in evaluating the services and capabilities delivered by the client to its customers.

The assessment database 806 holds one or more master capability structures 812. A master capability structure includes a comprehensive list of the capabilities that may apply to a particular industry or client. As discussed below, the client capability table generating logic 808 may use a master capability structure to generate a client capability table. The assessment database 806 may hold multiple master capability structures 812 for different service delivery applications. For example, Tables 1 and 2 show two exemplary master capability lists. Table 1 shows a master capability list for a "Customer Experience" service delivery application. Table 2 shows a master capability list for a "Customer Service & Support" service delivery application. Each master capability list may include a description of the capability, an identification of the touchpoint and channel associated with each capability, and the rating associated with each capability.

The assessment database 806 may also hold industry specific master capability structures 814 and client specific master capability structures 822. The industry specific master capability structures 814 may include, by way of example, an automotive industry master capability structure 816, an aviation industry master capability structure 818, a clothing industry master capability structure 820, and other master capability structures adapted to other specific industries. The client specific master capability structures 822 may include master capability structures 824-828 for client X, client Y, client Z, or for other specific clients.

The system 100, or an assessor using the system 100, may determine which capabilities of the master capability structure 814 are applicable to a specific industry or client. Accordingly, the industry specific master capability structures 814 may include capabilities that are applicable to that specific industry. The client specific master capability structures 822 may include those capabilities from the master capability structure 812 that are applicable to the specific client. A capability may be applicable to a specific industry or client if they are relevant to the client or industry. For example, the master capability structure 812 may include capabilities that are relevant to the aviation industry, but that are not relevant to the clothing industry, and visa versa. Determining which capabilities are applicable to specific industries or clients avoids penalizing a client for not utilizing a capability that is not relevant to its business.

The assessment database 806 may hold one or more point mappings 830 and one or more client rating scales 832. The point mapping 830 provides the capability level score associated with each capability rating level. FIG. 3 shows an exemplary point mapping 300. The point mapping 830 may include integer, decimal, or other numerical scores associated with each capability. The client rating scale 832 includes numerical ranges associated with each capability rating level. FIG. 7 shows an exemplary client rating scale 700. The assessment database 806 may include multiple industry and/or client specific point mappings 834.

The client capability table generating logic 808 may include instructions that cause the processor 802 to obtain a client assessment report as detailed above with respect to FIG. 4. The memory 804 may store the obtained client assessment report 834. FIG. 1 shows an exemplary client assessment report. The client assessment report 834 may be generated or completed by an assessor. The assessor determines whether capabilities applicable to the client are utilized by that client.

The client assessment report 834 may include capability implementation identifiers 836 and capability applicability identifiers 838. The client assessment report 834 may also include capability identifiers 840, touchpoint identifiers 842, and channel identifiers 844. The capability implementation identifiers 836 identify which capabilities are utilized by the client. The capability applicability identifiers 838 identify which capabilities are applicable to the client. The capability identifiers 840 may include a name and/or description of each capability. The touchpoint and channel identifiers 842 and 844 may include a name and/or description of each touchpoint and/or channel, respectively, associated with each capability.

The client capability table generating logic 808 determines an applicable point mapping 846 for the client assessment report 834 as detailed above with respect to FIG. 4. The client capability table generating logic 808 may select and retrieve the applicable point mapping 846 from among the point mappings 830 stored in the assessment database 806. As indicated above, the point mapping 830 may include industry and/or client specific point mappings. Based on an identification of the client or the client's industry, the client capability table generating logic 808 may identify and retrieve from the assessment database 806 the applicable point mapping 846. The applicable point mapping 846, such as the point mapping 300 shown in FIG. 3, may include capability rating levels and capability level scores associated with each capability rating level. The memory 804 may store the applicable point mapping 846.

When an assessor completes the client assessment report 834, the assessor may load the assessment report to the assessment database 806, a sharepoint site, or other location. The client capability table generating logic 808 may move the assessment report 834 to the memory 804 and generate a client capability table 848. If the client assessment report 834 is an Excel® file, for example, the client capability table generating logic 808 may initiate a Microsoft ETL package to load the client assessment report 834 into the memory 804 and execute a store procedure to validate the data and build the client capability table 848 for the specific client assessment. The memory 804 may store the client capability table 848. The store procedure may be a part of the client capability table generating logic 808, or a separate SQL program residing in the memory 804. The store procedure may call another store procedure that triggers the score determining logic 810.

The client capability table 848 includes capability implementation specifiers 850, capability IDs 852 for the capability implementation specifiers 850, and point assignments 854 retrieved from the applicable point mapping 846 for the capability IDs 852. The client capability table 848 may also include capability rating levels 856 associated with each capability. An exemplary client capability table 848 is discussed in more detail above and shown in FIG. 5.

The score determining logic 810 determines a total applicable capability metric 858 as detailed above with respect to FIG. 6. The total applicable capability metric 858 metric may include the total number of applicable capabilities across an identified capability group 860. The identified capability group 860 may include all touchpoints, a single touchpoint, a single channel, a combination of touchpoints or channels, a specific channel within a touchpoint, and/or other groupings of applicable capabilities. The memory 804 may store the total applicable capability metric 858 and the identified capability group 860.

The memory 804 may store a total assessment score 862, a final assessment score 864, and a final assessment rating 866. The score determining logic 810 may look up the point assignment 854 associated with each utilized capability. The score determining logic 810 may use the capability implementation specifiers 850 to identify which of the applicable capabilities are utilized by the client. The total assessment score 862 may equal the sum of the point assignments 854 associated with each utilized capability. The score determining logic 810 determines the final assessment score 868 based on the total applicable capability metric 858 and the final assessment score 864. For example, the final assessment score 864 may equal the total assessment score 862 divided by the total applicable capability metric 858.

Based on the final assessment score 864, the score determining logic 810 may determine the final assessment rating 866. The score determining logic 810 may compare the final assessment score 864 with an applicable client rating scale 868 to determine the final assessment rating 866. The applicable client rating scale 868 may include a numerical range associated with each possible rating (e.g., Basic, Parity, Competitive, and Differentiated). The score determining logic 810 may assign the final assessment rating 866 according which numerical range the final assessment score 864 falls within. The score determining logic 810 may select and retrieve the applicable client rating scale 868 from among the client rating scales 832 stored in the assessment database 806. As indicated above, the client rating scale may include industry and/or client specific client rating scales. Based on an indication of the client or the client's industry, the score determining logic 810 may identify and retrieve from the assessment database 806 the applicable client rating scale 868. Based on the applicable client rating scale 868 and the final assessment score 864, the score determining logic determines the final assessment rating 866.

The system 800 may determine a final assessment score 864 and/or final assessment rating 866 across multiple identified capability groups. For example, the system 800 may determine final assessment scores 864 and ratings 866 for each is individual touchpoint or channel. The system 800 may additionally or alternatively store the final assessment scores 864 and ratings 866 in a client score repository 870 in the assessment database 806. The client score repository 870 may include the final assessment scores 864 and ratings 866 for multiple clients that have used the system 800.

The memory 804 may include report generating logic 872. The report generating logic 872 may generate and display a variety of final assessment reports 874 for the client based on the final assessment score 866 and the final assessment rating 868. FIGS. 9-12 show exemplary final assessment reports 874 that may be generated by the report generating logic 872. The memory 804 may store the final assessment reports 874. The system 800 may interact with the client and/or assessor using a display 876.

The final assessment reports 874 may include a comparison of the client's final assessment scores 864 and ratings 866 to the final assessment scores and ratings stored in the client score repository 870 for other clients that have used the system 800. The comparison assists the client in comparing its practices to the practices of other companies to determine where it distinguishes itself from, or lags behind, its competition.

Exemplary aspects, features, and components of the system are described above. However, the system may be implemented in many different ways. For example, although some features are shown stored in computer-readable memories (e.g., as logic implemented as computer-executable instructions or as data structures in memory), all or part of the system and its logic and data structures may be stored on, distributed across, or read from other machine-readable media. The media may include hard disks, floppy disks, CD-ROMs, a signal, such as a signal received from a network or received over multiple packets communicated across the network.

The system may be implemented with additional, different, or fewer components. As one example, a processor may be implemented as a microprocessor, a microcontroller, a DSP, an application specific integrated circuit (ASIC), discrete logic, or a combination of other types of circuits or logic. As another example, memories may be DRAM, SRAM, Flash or any other type of memory. The processing capability of the system may be distributed among multiple components, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that prepares intermediate mappings or implements a search on the mappings. As another example, the DLL may itself provide all or some of the functionality of the system, tool, or both.

Figure 9:
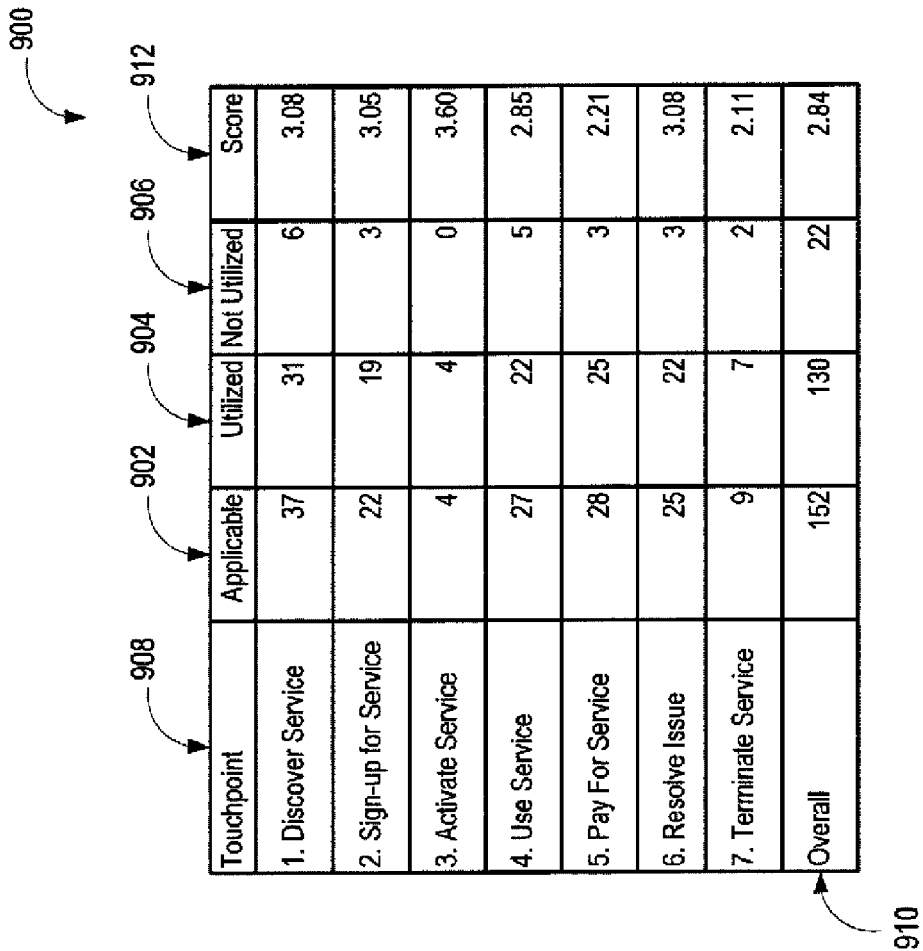
FIG. 9 shows a final assessment report.
Figure 10:
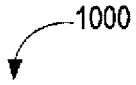
FIG. 10 shows an exemplary client comparison report.

FIGS. 9-10 show final assessment reports that may be generated by the report generating logic. In particular, FIG. 9 shows an exemplary client capability summary 900 ("summary 900"). The summary 900 shows the number of applicable capabilities 902, utilized capabilities 904, and "not utilized" capabilities 906 for each touchpoint 908, as well as overall data 910 across all touchpoints. The summary 900 also shows a final assessment score 912 for each touchpoint, including an overall score. As discussed above with respect to FIG. 8, a capability assessment system may use the final assessment scores 912 to determine a final assessment rating for each touchpoint and/or across all touchpoints. A similar report may be generated to show final assessment scores for each channel.

FIG. 10 shows an exemplary client comparison report 1000 ("report 1000"). The report 1000 ranks several clients for which final assessment scores and ratings have been determined into quartiles. The report 1000 may be configured to rank the clients into more or less than four groups. Reports similar to the report 1000 may be generated for each touchpoint and/or channel. For example, a client comparison report for the touchpoint "Sign-up for Service" may be generated that ranks the clients based on their respective scores for the "Sign-up for Service" touchpoint. Such reports effectively inform each client where they differentiate themselves from, or lag behind, other like companies, allowing companies to more precisely prioritize and identify which improvements to its rendered services will have the greater overall impact. Reports may also be generated that compare the several clients on a capability by capability basis, or that chart or graph each client's scores in relation to each other.

The companies with which a client may be compared in the report 1000, or other like reports, may be determined on an outside-view or inside-view basis. With the outside-view approach, companies may be grouped based on the customer's perspective. With the inside-view approach, companies may be grouped based on the client perspective, such as through comparison with their peers within the same industry. In the outside-view approach, the client may be compared to companies in other industries as well.

For example, a cable company may be compared to other cable companies under the inside-view approach. In the outside-view approach, the cable company may be compared to, in addition to other cable companies, service providers that service the same or substantially similar customer base and offers similar types of services, such as telephone service providers, internet providers, utilities companies, electronics merchandise providers, and/or other service providers selected based on the described outside-view approach. The outside-view approach may assist a client to be better in tune with customer expectations and learn successful techniques from other companies it may not typically identify with. In addition, conducting the assessment from the customer's perspective (the outside-view approach) may allow the client to effectively differentiate itself from peers and be better in tune with customer expectations and learn successful techniques from other companies it may not typically identify with.

Tables 1 and 2 below show portions of exemplary master capability lists. Table 1 is a portion of a master capability list that may be used in a comparative landscape tool that assesses the overall customer experience provided by the client. Table 2 is a portion of a master capability list that may be used in a comparative landscape tool that assesses the customer service and support provided by the client. The master capability list may be dynamic lists. The ratings may be updated or modified. Capabilities, channels, and/or touchpoints may be added, modified, or removed. These and/or other changes may be a result of industry changes or trends, client/industry preferences, system updates, or other influences.

TABLE 1

| Touchpoint | Rating | Channel | Capability |
| --- | --- | --- | --- |
| 1. Discover Service | Basic | Assisted | agents: different agents handle different products (e.g.: cable, home phone, wireless) |
| 2. Sign-Up for Service | Basic | Assisted | phone numbers: different for different products |
| 6. Resolve Issues | Parity | Assisted | IVR: voice recognition capability |
| 1. Discover Service | Parity | Assisted | IVR: friendly voice |
| 3. Activate Service | Differentiated | Assisted | agents: friendly, helpful, accommodating & understands the customer. Demonstrate 7 customer experience dimensions: acknowledgment, efficiency, knowledgeable, control, choice, commitment, & consistency. |
| 4. Use Service | Differentiated | Assisted | agents: friendly, helpful, accommodating & understands the customer. Demonstrate 7 customer experience dimensions: acknowledgment, efficiency, knowledgeable, control, choice, commitment, & consistency. |
| 2. Sign-Up for Service | Parity | Face to Face | Allow customers to sign-up: via authorized dealers (products/services dependent) |
| 3. Activate Service | Parity | Face to Face | field reps: set-up fee is not charged for technician visits |
| 4. Use Service | Parity | Face to Face | industry-specific: tree trimming crews trim trees away from power lines |
| 5. Pay For | Basic | Assisted | agents: different products (e.g.: cable, home phone, |

TABLE 1-continued

| Touchpoint | Rating | Channel | Capability |
|---|---|---|---|
| Service | | | wireless) are handled by different agents |
| 5. Pay For Service | Competitive | Self-Service | payment (channel): at stores using automated payment kiosks (or similar machines) |
| 6. Resolve Issues | Differentiated | Face to Face | service appointment window: 2-2.5 hrs |
| 7. Terminate Service | Basic | Assisted | cancellations: require live agents |
| 7. Terminate Service | Basic | Face to Face | cancellations: For security reasons customers are required to call in order to cancel their account. Accounts will be closed shortly after customers' requests. |

TABLE 2

| Touchpoint | Rating | Channel | Capability |
|---|---|---|---|
| service strategy: Customer Segmentation Analysis | Basic | back-office | Limited or no access to customer data for conducting segmentation analysis |
| service strategy: Industry Trends & Competitor Analysis | Parity | back-office | Analysis results not well integrated with overall service business planning |
| service strategy: Professional Services Strategy | Differentiated | back-office | Explicit statement of strategy to offer or not offer services beyond the product platforms sold by the company. |
| service offering development: Warranty Design & Integration | Basic | back-office | Manufacturing targeted at minimizing unit production cost with no view on total cost of ownership. |
| services marketing: Marketing Objectives & Strategy | Parity | back-office | Marketing objectives and strategies are not aligned with overall service business plan. |
| services marketing: Marketing Objectives & Strategy | Differentiated | assisted & face-to-face | Online and offline marketing efforts are integrated. |
| services marketing: Service Portfolio Analysis | Differentiated | back-office | The measurement system balances short-term objectives with long-term goals, financial metrics with nonfinancial metrics, and external performance (customer satisfaction) with internal business process performance. |
| service selling: Customer Contract Negotiation & Creation | Basic | back-office | Inconsistent contract creation and management process |
| services selling: Customer Contract Negotiation & Creation | Parity | assisted & face-to-face | Paper forms are used for contracts |
| services selling: Customer Contract Negotiation & Creation | Parity | self-service | Remote users can not edit contracts data bases |
| services selling: Sales Execution | Basic | assisted & face-to-face | Little to no channel sales support. |
| services event management: Email | Basic | back-office | Processed manually through company email system (Outlook, etc.); no email management system in place. |
| service event management: Scheduling & Dispatch | Basic | back-office | Dispatching, route determination, and service area rules either do not exist or are informal. |
| service event management: Web/esupport | Basic | self-service | Internet interactions are limited to electronic service sales literature (e.g. service contact information, service locations, hours of operation, etc.) |
| installation, maintenance & repair: field repair | Basic | assisted & face-to-face | Majority of repairs are carried out without any pre-diagnosis. |
| installation, maintenance & repair: installation management | Basic | assisted & face-to-face | Adjustments and rework % is high. |
| installation, maintenance & repair: predictive maintenance | Basic | back-office | OEM supplied embedded technology is not fully leveraged. |
| service parts & logistics management: inventory replenishment | Differentiated | back-office | Automatic notification of excess/obsolete inventory. |

TABLE 2-continued

| Touchpoint | Rating | Channel | Capability |
|---|---|---|---|
| service parts & logistics management: returns | Basic | back-office | Does not address reverse logistics/returns. |
| professional services: prof svc sales & delivery | Basic | back-office | Hardware leads the sale. |
| partner relationship management: partner relationship mgt | Parity | back-office | Data shared between organizations is not automated. |
| customer account management: contract management | Basic | back-office | All validations are performed manually; reviewers ensure that rules and standards have been followed by the preparers. |
| customer account management: customer billing | Parity | back-office | Billing does not promote a steady revenue stream |
| product lifecycle management: defect tracking | Basic | back-office | Defects are not tracked |
| human performance/ knowledge management: career path/ compensation | Basic | back-office | Compensation system is not tied to performance. |
| human performance/ knowledge management: performance management | Parity | back-office | A myriad of inconsistent performance metrics analyzed infrequently. |
| human performance/ knowledge management: training management | Competitive | back-office | Formal training curriculums and programs are provided, utilized, and tracked for compliance. |

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A capability assessment method comprising:
obtaining a client assessment report comprising capability implementation indicators;
determining, using a computer processor, an applicable point mapping for the client assessment report, comprising:
identifying a set of capability levels, wherein each capability level comprises a different rating identifier;
determining a tuning gap defining a scoring relationship between adjacent capability levels; and
assigning a capability score to each capability level based on the tuning gap;
building, using the computer processor, a client capability table based on the client assessment report and the applicable point mapping and comprising:
a list of client applicable capabilities from a client;
a capability score from the applicable point mapping assigned to each client applicable capability; and
a capability implementation specifier assigned to each of the client applicable capabilities listed in the client assessment report, each capability implementation specifier defining whether the corresponding client applicable capability is implemented by the client;
determining, using the computer processor, a total applicable capability metric based on the capability scores assigned to the client applicable capabilities listed in the client capability table; determining, using the computer processor, a total assessment score based on the capability scores assigned to the client applicable capabilities that are assigned to a capability implementation specifier indicating actual implementation of the client applicable capability at the client; and
determining, using the computer processor, a final assessment score based on the total assessment score and the total applicable capability metric.

2. The method of claim 1, where determining an applicable point mapping comprises:
determining an applicable non-linear point mapping for the client assessment report.

3. The method of claim 1, where determining a total applicable capability metric comprises:
determining an identified capability group; and
determining a total number of applicable capabilities with the identified capability group.

4. The method of claim 3, where the identified capability group comprises capabilities associated with a touchpoint.

5. The method of claim 1, further comprising:
determining, using the computer processor, an applicable client rating scale; and
determining, using the computer processor, a final assessment rating based on the applicable client rating scale and the final assessment score.

6. The method of claim 1, further comprising:
comparing the final assessment score to assessment scores associated with other clients; and
generating a report based on the comparing.

7. The method of claim 1, where determining a total assessment score comprises:
determining a sum of the point assignments over True-valued capability implementation specifiers.

8. The method of claim 1, where the applicable point mapping further comprises:
determining an applicable non-sequential integer sequence.

9. A capability assessment system comprising:
a processor; and
a memory coupled to the processor, the memory comprising:
client capability table generating logic operable to:
obtain a client assessment report comprising capability implementation indicators;

determine an applicable point mapping for the client assessment report, comprising:
identifying multiple capability levels, wherein each capability level comprises a different rating identifier;
determining a tuning gap defining a scoring relationship between adjacent capability levels; and
assigning a capability score to each capability level based on the tuning gap; and
build a client capability table based on the client assessment report and the applicable point mapping and comprising:
a list of client applicable capabilities for a client;
a capability score of the applicable point mapping assigned to each client applicable capability; and
a capability implementation specifier assigned to each of the client applicable capabilities listed in the client assessment report, each capability implementation specifier defining whether the corresponding client applicable capability is implemented by a client;
score determining logic operable to:
determine a total applicable capability metric based on the capability scores assigned to the client applicable capabilities listed in the client capability table;
determine a total assessment score based on the point assignments and capability implementation specifiers based on the capability scores assigned to the client applicable capabilities that are assigned to a capability implementation specifier indicating actual implementation of the client applicable capability at the client; and
determine a final assessment score based on the total assessment score and the total applicable capability metric.

10. The system of claim 9, where determining an applicable point mapping comprises:
determining an applicable non-linear point mapping for the client assessment report.

11. The system of claim 9, where determining a total applicable capability metric comprises:
determining an identified capability group; and
determining a total number of applicable capabilities with the identified capability group.

12. The system of claim 9, where determining a total assessment score comprises:
determining a sum of the point assignments over True-valued capability implementation specifiers.

13. The system of claim 9, where determining the applicable point mapping comprises:
determining an applicable non-sequential integer sequence.

14. A product comprising:
a memory;
client capability table generating logic stored in the memory and operable to cause a computer processor to:
obtain a client assessment report comprising capability implementation indicators;
determine an applicable point mapping for the client assessment report, comprising:
identifying multiple capability levels, wherein each capability level comprises a different rating identifier; and
determining a tuning gap defining a scoring relationship between adjacent capability levels; and
assigning a capability score to each capability level based on the tuning gap; and
build a client capability table based on the client assessment report and the applicable point mapping and comprising:
a list of client applicable capabilities for a client;
a capability score of the applicable point mapping assigned to each client applicable capability; and
a capability implementation specifier assigned to each of the client applicable capabilities listed in the client assessment report, each capability implementation specifier defining whether the corresponding client applicable capability is implemented by the client;
score determining logic stored in the memory and operable to cause the computer processor to:
determine a total applicable capability metric based on the capability scores assigned to the client applicable capabilities listed in the client capability table;
determine a total assessment score based on the point assignments and capability implementation specifiers based on the capability scores assigned to the client applicable capabilities assigned to a capability implementation specifier indicating actual implementation of the client applicable capability at the client; and
determine a final assessment score based on the total assessment score and the total applicable capability metric.

15. The product of claim 14, where determining an applicable point mapping comprises:
determining an applicable non-linear point mapping for the client assessment report.

16. The product of claim 14, where determining a total applicable capability metric comprises:
determining an identified capability group; and
determining a total number of applicable capabilities with the identified capability group.

17. The product of claim 14, where determining a total assessment score comprises:
determining a sum of the point assignments over True-valued capability implementation specifiers.

18. The product of claim 14, where determining the applicable point mapping comprises:
determining an applicable non-sequential integer sequence.

19. The method of claim 1, wherein the applicable point mapping comprises:
a first capability level;
a second capability level;
a third capability level;
a first tuning gap comprising a scoring relationship between the second capability level and the first capability level; and
a second tuning gap comprising a scoring relationship between the third capability level score and the second capability level score.

20. The method of claim 19, wherein determining the applicable point mapping comprises:
tailoring the first and second tuning gaps to the client; and
assigning scores to each of the capability levels based on the tailored tuning gaps.

21. The method of claim 1, wherein determining the applicable point mapping comprises tailoring the tuning gap to the client industry.

22. The system of claim 9, wherein the applicable point mapping comprises:
- a first capability level;
- a second capability level;
- a third capability level;
- a first tuning gap comprising a scoring relationship between the second capability level and the first capability level; and
- a second tuning gap comprising a scoring relationship between the third capability level score and the second capability level score.

23. The system of claim 22, wherein determining the applicable point mapping comprises:
- tailoring the first and second tuning gaps to the client; and
- assigning scores to each of the capability levels based on the tailored tuning gaps.

24. The system of claim 9, wherein determining the applicable point mapping comprises tailoring the tuning gap to the client industry.

25. The product of claim 14, wherein the applicable point mapping comprises:
- a first capability level;
- a second capability level;
- a third capability level;
- a first tuning gap comprising a scoring relationship between the second capability level and the first capability level; and
- a second tuning gap comprising a scoring relationship between the third capability level score and the second capability level score.

26. The product of claim 25, wherein determining the applicable point mapping comprises:
- tailoring the first and second tuning gaps to the client; and
- assigning scores to each of the capability levels based on the tailored tuning gaps.

27. The product of claim 14, wherein determining the applicable point mapping comprises tailoring the tuning gap to the client industry.

* * * * *